Inventor
Josie C. Barefoot
By Lester L. Sargent
Attorney

May 30, 1939.    J. C. BAREFOOT    2,159,960
SAFETY DEVICE FOR AUTOMATIC STOPPING OF
VARIOUS ELECTRICALLY DRIVEN MACHINES
Filed June 25, 1938    5 Sheets-Sheet 5
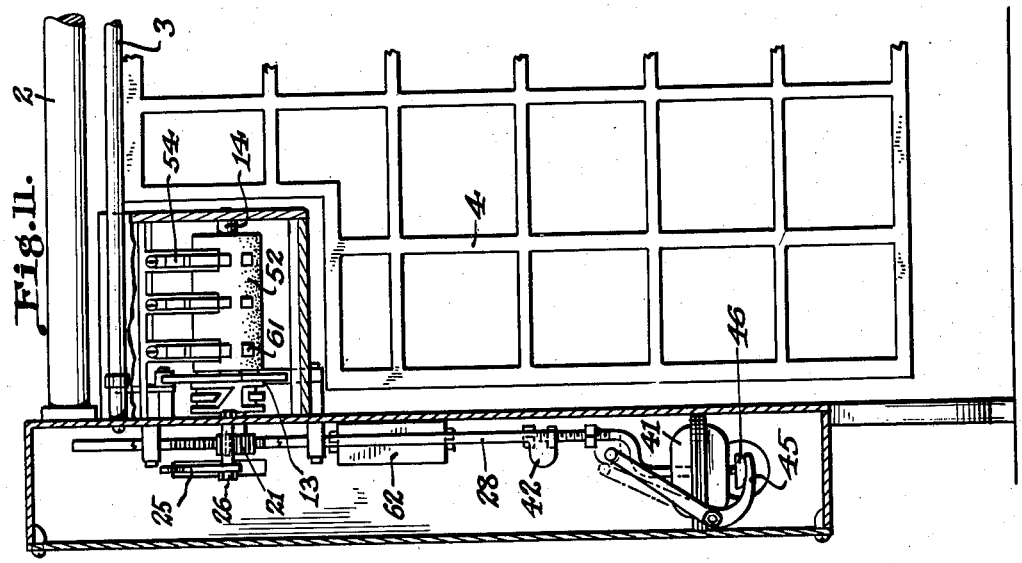
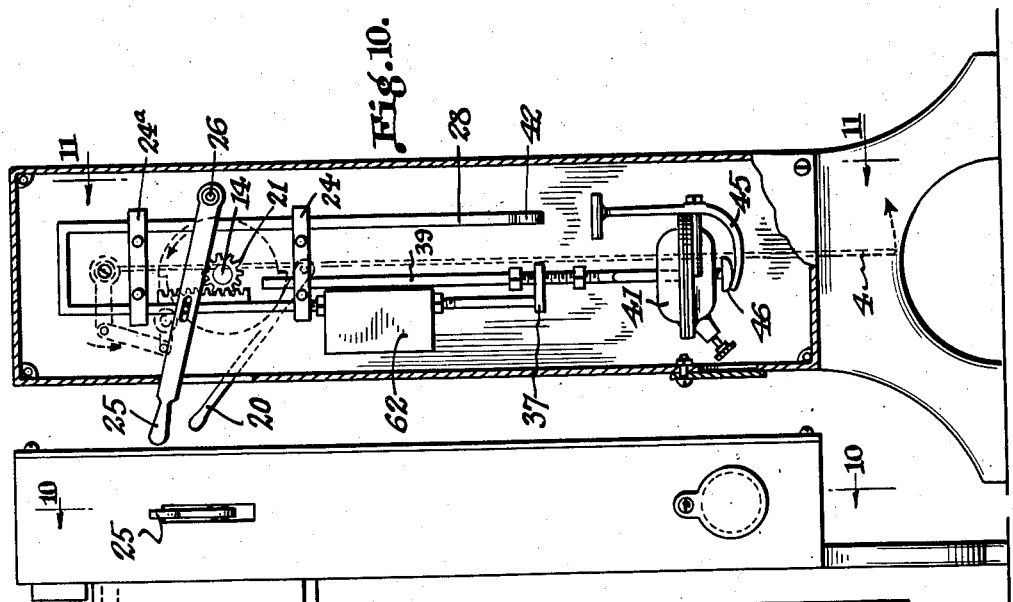
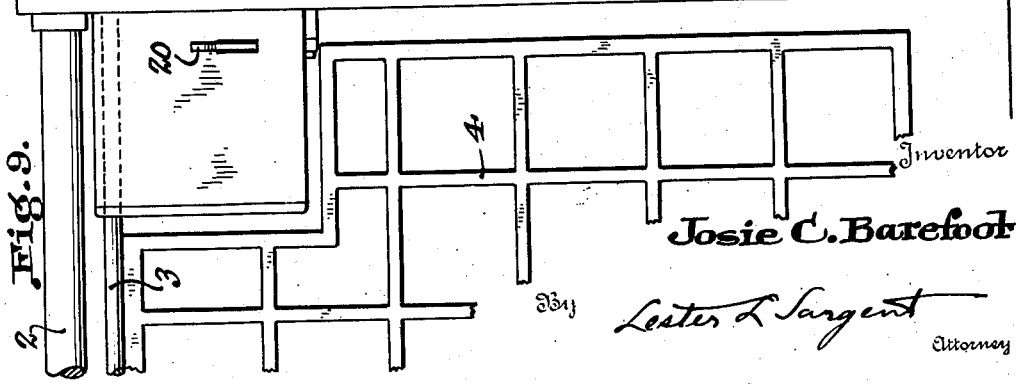
Inventor
Josie C. Barefoot
By Lester L. Sargent
Attorney Patented May 30, 1939

2,159,960

UNITED STATES PATENT OFFICE 2,159,960

SAFETY DEVICE FOR AUTOMATIC STOPPING OF VARIOUS ELECTRICALLY DRIVEN MACHINES

Josie C. Barefoot, Charlotte, N. C.

Application June 25, 1938, Serial No. 215,907

10 Claims. (Cl. 192—130)

The object of my invention is to provide an improved safety device for stopping, and if desired, for both stopping and causing a temporary reverse operation of various machines such as dough rolling machines, such as is illustrated in my Patent No. 1,804,853, Laundry machines, and any electric motor-driven machines. It is also an object of my invention to provide mechanism which will operate to immediately and automatically stop a machine when the operator's hand accidently becomes placed or is caught in a dangerous position in the mechanism of the machine, and which has novel means for applying the electricity of the motor as a brake by reversing the motor.

It is also an object of my invention to provide adjusting mechanism in connection with such a safety device whereby the time period of the reverse operation of the motor may be regulated or controlled to a predetermined period.

It is also an object of my invention to provide a novel modification of the device whereby the actuating means may be operated by a weight element instead of by a spring.

It is also an object to provide the novel combination and arrangement of parts disclosed in the accompanying drawings and hereinafter described and claimed.

I attain these and other objects of my invention by the mechanism illustrated in the accompanying drawings, in which—

Figure 3:
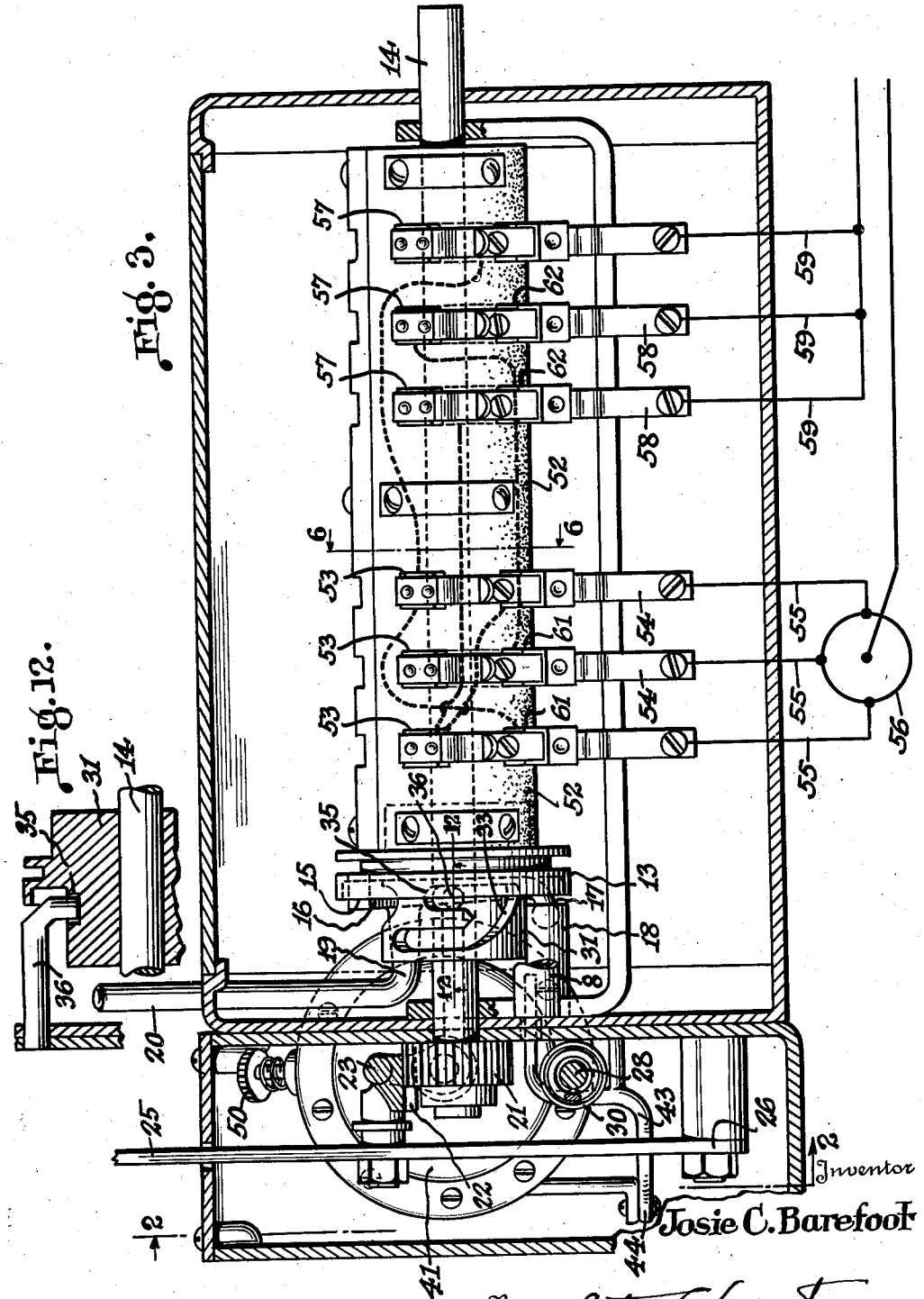
Fig. 3 is a longitudinal section.
Figure 4:
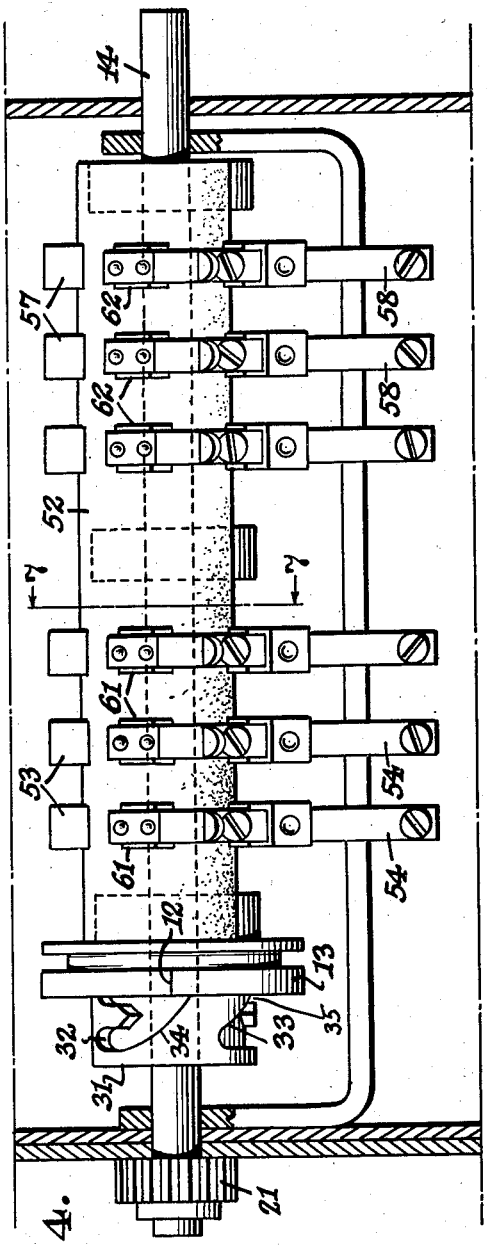
Figure 5:
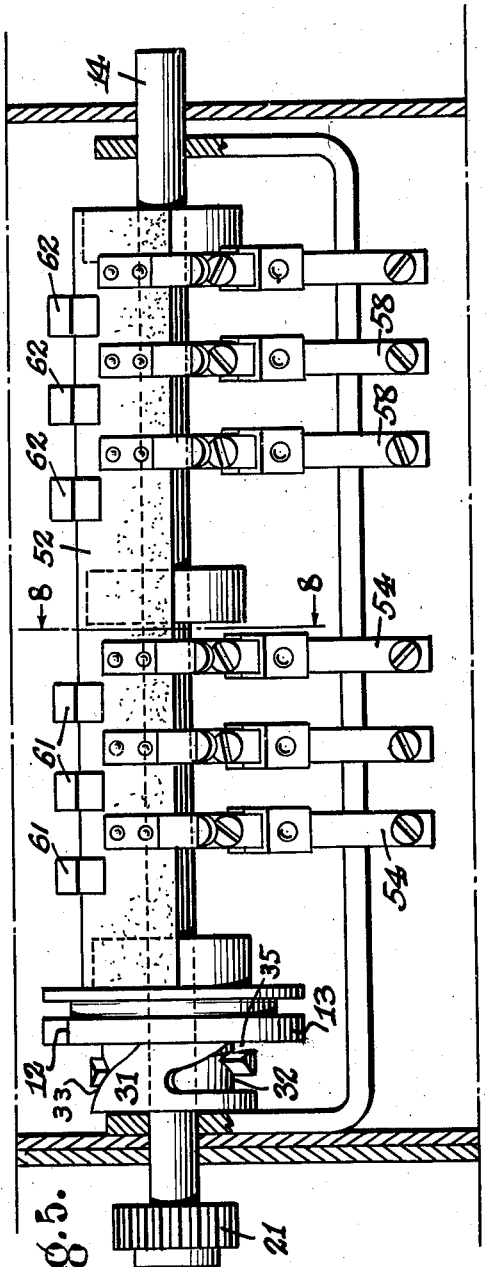
Figure 13:
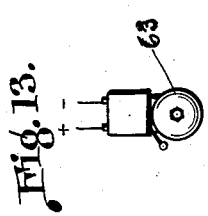

Fig. 4 is a longitudinal section showing the position of the cam element 31, annular flange 13 and switch drum 52 when the parts are in contact for the reversal of current through the motor;

Fig. 5 is a longitudinal section showing the position of the cam element 31, annular flange 13 and switch drum 52 when the device is in arrested position with the contacts disengaged so that no current flows through the motor and therefore the machine comes to a complete stop;

Fig. 6 is a detail sectional view on line 6—6 of Fig. 3;

Fig. 7 is a detail sectional view on line 7—7 of Fig. 4;

Fig. 8 is a detail sectional view on line 8—8 of Fig. 5;

Fig. 9 is a front plan view of my safety device showing a preferred modification in which the device is disposed vertically on the supporting frame; and also showing a portion of the apron supporting frame 2 and apron 4 for operating the safety device;

Fig. 10 is a vertical section on line 10—10 of Fig. 9;

Fig. 11 is a vertical section on line 11—11 of Fig. 10;

Fig. 12 is a detail view of the L-shaped finger 36 and a portion of cam 31, the cam grooves of which it operatively engages; and, Fig. 13 is a detail elevation of the audible signal by which a warning signal is sounded when the safety device is operated.

Referring to the accompanying drawings, I have illustrated the invention as applied to a dough-rolling machine having a frame 1 and having a preferably U-shaped apron supporting frame 2 positioned at the front of the machine. A swingable horizontal rod 3 is mounted at any desired position on this apron supporting frame 2 and on rod 3 an apron 4 is affixed and swingably suspended or pivotally supported. Attached to or operatively connected with the apron 4 is a link 5 which is attached to the arm 6 extending from the round stub shaft 7 which is mounted in the hollow support 8. Stub shaft 7 has a projection 9 to which a spring 10 is attached, which normally causes the arm 6 to exert downward tension against the link 5. The stub shaft 7 also has a trip member 11 positioned to engage in the under recessed portion 12 of the annular flange 13 which is mounted on the main shaft 14, to which the electric switch mechanism hereafter described is suitably connected. This annular flange 13 also has an upper recessed portion 15 which when the machine is at rest, is engaged by the trip finger 16 which is mounted on the stub shaft 17, carried in the hollow support 18. Also affixed to the finger 16 is a horizontal arm 19 to which a pivotally mounted upright control or starting lever 20 is affixed, whereby the trip finger 16 may be operated to throw it out of engagement with the flange 13 whereby to set the machine into operation.

The shaft 14 which carries the flange 13 also extends through the frame 1 of the machine and carries a pinion 21 which meshes with the rack shaft 22 which is affixed to bar 23 slidably mounted in spaced supports 24 and 24a. This bar is affixed to an operating lever 25 for arresting or resetting the machine. This lever 25 is pivotally mounted at its lower end on the frame at 26. This bar 23 is rigidly secured by the link bar 27 to a parallel bar 28, which also is slidably mounted in the spaced supports 24 and 24a. The parallel bar 28 carries a collar 29, and a spring 30 is interposed between said collar 29 and the support 24a in which the bar is slidably mounted.

The shaft 14 which carries the flange 13 also carries a cam element 31 having an outer cam groove 32 provided with spaced slanting cam groove passage 33 and 34 and an inner groove 35. An L-shaped finger 36 is mounted on the frame and has its operative end projecting into the cam groove.

When the shaft 14 is rotated due to movement of the apron 4, spring 30 which is engaged by collar 29 carried by bar 28 actuates that bar and link bar 27, bar 23, rack shaft 22, which is affixed to bar 23, and pinion 21 which meshes with rack shaft 22 to rotate shaft 14, cam 31 and switch drum 52. L-shaped finger 36 (shown in Fig. 12) initially rides in outer cam groove 32. As the cam 31 rotates, the finger 36 comes in contact with the wall of slanting cam groove 33 causing shaft 14 and switch drum 52 to move longitudinally while they rotate and thereby disconnects the electrical contact members carried by switch drum 52 from the other contact members above described. When the switch drum 52 is reset to its initial position by operation of the stopping and resetting lever 25, the L-shaped finger 36 follows inner cam groove 35 until it reaches slanting cam groove 34, contact with the wall of which actuates the shaft 14 and the switch drum 52 in a longitudinal as well as a rotary direction to restore these elements to their initial position with finger 36 again in the outer cam groove 32.

I provide a novel time control or regulating mechanism for controlling the period of time that the machine is operated in reverse to a predetermined period of time. After the machine to which my device is attached is set in operation, if the safety apron 4 is operated, it disengages trip member 11 from engagement with the under recessed portion 12 of annular flange 13, allowing the shaft 14 and the annular flange 13 to rotate, shaft 14 being propelled by the pinion 21 activated by rack shaft 22 carried by bar 23, and operatively attached by link bar 27 to bar 28 and propelled by spring 30, thereby causing both bars 23 and 28 to slide forwardly.

The upper bar 23 carries a finger 37 which engages nut or collar 38 on the shaft 39, the forward end of which is affixed to a diaphragm 40 in the control chamber 41. When the apron is tripped, the shaft 38, which has therefore been in a retracted position is propelled forwardly and presses the diaphragm from a rearwardly offset position to a forwardly offset position from center to compress air in the chamber on the far side of the diaphragm. At the same time the lower rod which carries the projecting cam member 42 on bar 28 engages the V-shaped lever 43, which lever is pivotally mounted at its apex 44 and which has an upturned end 45 which is operatively engageable with the check valve 46 which normally prevents any air from escaping from the central chamber 41, the check valve 46 being normally held in its seated position by the spring 47.

The control chamber has an air escape passage 48 which is adjustably controlled by a needle valve 49, which carries an operating disk or handle 50 by which it may be adjusted to regulate the amount of air escaping through the air-escape passages 48.

When the machine is reset to its inoperative position by operating lever 25, the shaft 39 operating the diaphragm 40 is pulled rearwardly by reason of the engagement of nut or collar 51 with the finger 37 carried by bar 23 so that the diaphragm is in a rearwardly offset position in the control chamber to enlarge the operative volume or area of the air chamber.

Referring to Fig. 12 the switch drum 52 carries contacts 53 with which corresponding spring-controlled electrical contacts 54 are adapted to be brought into electrical contact, a drum type of switch being preferred and the switch mechanism being connected by wires 55 with suitable operating means, such as a motor 56. The contacts 53 are mounted on the drum 52, as shown in Fig. 3. Any suitable reversing switch might be used.

When the machine is at rest, the contacts 53, 54, 57 and 58 are disengaged. When the starting lever 20 is operated it causes the shaft 14 and switch drum 52 to be rotated to a position where the contacts are in electrical contact, as shown in Fig. 6, and the machine is set in operation.

If the operator gets his hands entangled in the roller of the machine it will pull him forward which will cause his knees to press against the apron 4, the movement of which in turn will operate link 5 which operates arm 6 to disengage trip member 11 from the recessed portion 12 of annular flange 13, thereby permitting the shaft 14 to rotate in the manner heretofore described.

Figure 1:
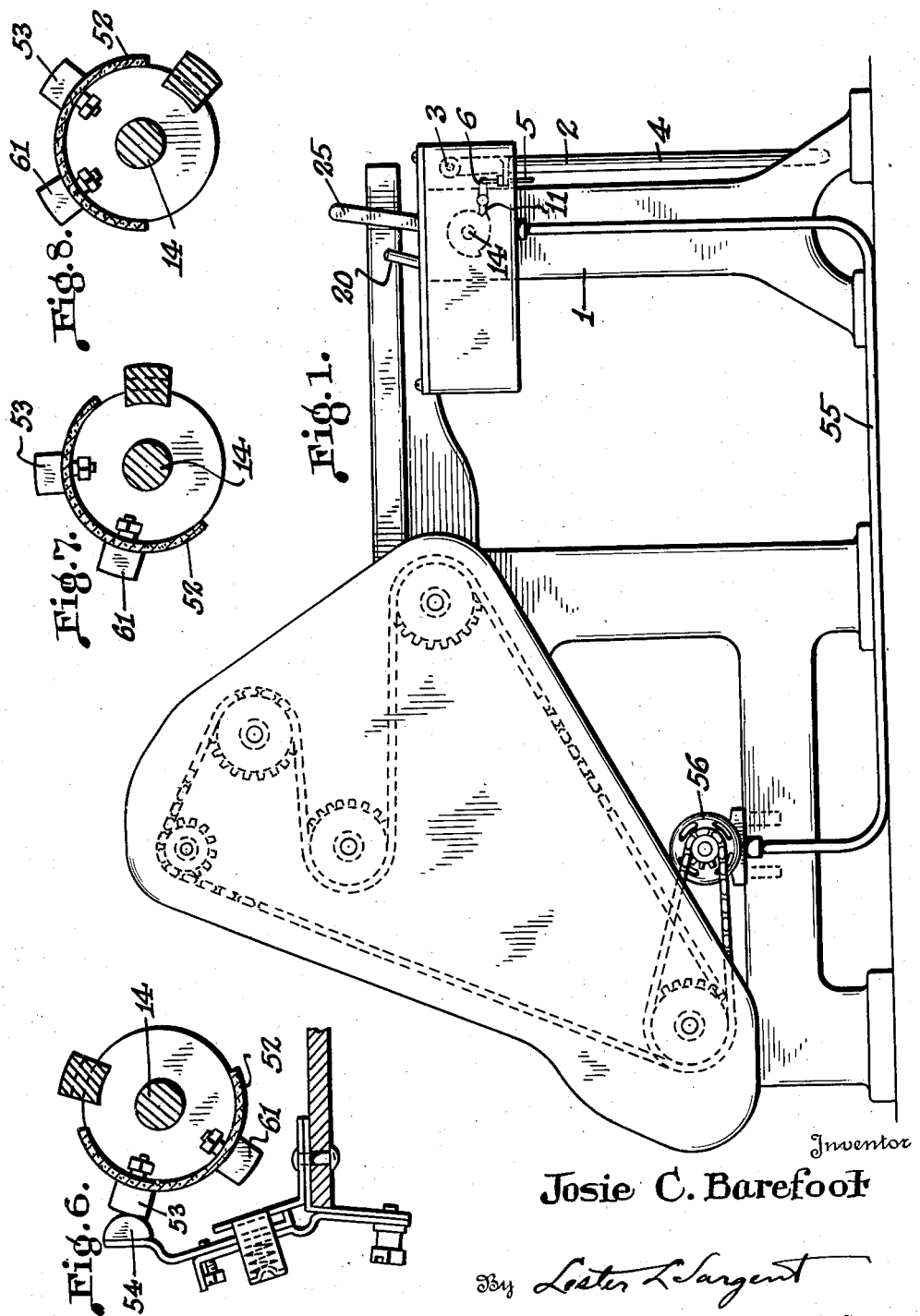
Figure 1 is a side elevation of one form of my invention applied to a dough rolling machine.
Figure 2:
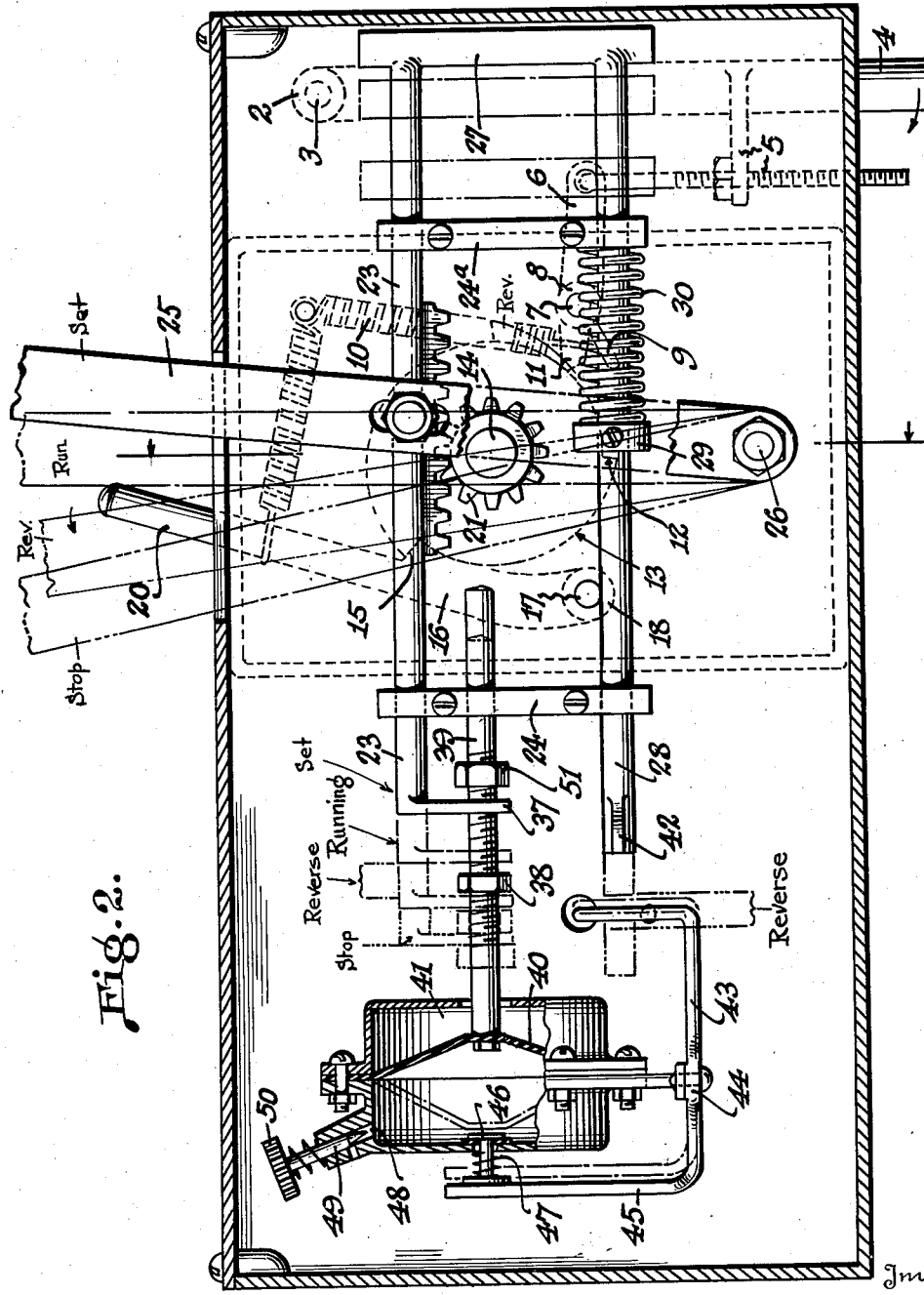
Fig. 2 is a vertical section on line 2—2 of Fig. 3, some of the parts being shown in elevation and with the lever 25 shown in dotted lines in the several different positions to which it may be shifted.

The cam mechanisms cause a longitudinal movement of the shaft and drum along with its rotary movement, whereby the contact members 53, 54, 57 and 58, respectively are disengaged from each other to stop operation of the machine and almost immediately thereafter the contacts 53 and 57 are engaged with corresponding sets of reverse contacts 61 and 62 to cause the machine to operate in reverse direction. The period of reverse operation is limited to a predetermined or regulated time or period by the air chamber control mechanism already described and illustrated in Fig. 2.

As the shaft 14 and switch drum 52 are rotated and moved longitudinally, the reverse contacts 61 and 62 on switch drum 52 during this predetermined period are being moved to a position out of contact with the contacts 53 and 57 by the above described rotary and longitudinal movement of the switch drum 52, which carries reverse contacts 61 and 62.

Referring to Figs. 9, 10, and 11, there is illustrated an improved arrangement of my invention in which the switch-control mechanism is disposed in a vertical instead of in a horizontal position on the frame. Besides providing a better disposition of the weight of the apparatus on the frame on which it is mounted, it permits the substitution of a weight 62 in place of spring 30 as an actuating means for the switch control mechanism. This affords the advantage of a more constant actuating means than a spring which may in time become less effective.

Referring to Fig. 13, there is illustrated an audible signed 63 which may be electrically connected by conventional wiring with the switch drum mechanism and operated simultaneously with the operation of the switch control mechanism, if it is desired to give warning immediately to others in the building whenever an accident occurs to the operator of the machine to which my safety device is applied.

In operation, the machine to which my safety device is applied is started by operating the starting lever 20 in a forward direction away from the operator, which throws the electric switch into electrical contact to set the mechanism of the entire machine in operation. In ordinary use when desired to stop the machine, this is done by moving the stopping lever 25 in a direction rearward from the machine to which my safety device is applied and toward the operator.

When an accident occurs and the hands of the operator are drawn into the rollers or other operating mechanism of the machine, pressure of the operator's knees against the swingable apron 4 of my safety device will swing the apron and thus move link 5 and actuate the trip member 7 from engagement with flange 13 which will release the main shaft 14 so that it will rotate being indirectly actuated by spring 30, or an equivalent weight element, and thus rotate the switch drum 52, both members 52 and 14 also being simultaneously moved longitudinally and rotated to first stop the machine and then bring the spring-controlled electric contacts 54, 58 into electric contact with the reverse contacts 61, 62, whereby the machine is thrown into a reverse operation for a brief predetermined period of time, governed by the operation of the control mechanism heretofore described. The electric contacts are thereafter disconnected and the entire machine stopped by movement of the aforesaid reverse contacts 61 and 62 out of electrical contact with the contacts 54 and 58.

What I claim is:

1. In a safety device for automatic stopping of various electrically driven machines, the combination with a machine of the type described, of an electric switch adapted to set the mechanism of the machine in operation, a rotary shaft and drum carrying said switch, an annular flange on said shaft, said flange having spaced recessed portions, a trip member engaging one of said recessed portions, a starting lever operating said trip member to set the machine into operation, a swingable apron positioned adjacent the machine and in front of the operator, a link connected to the said swingable apron, a trip member operable by said link and normally engaging one of said recessed portions of the aforesaid flange and adapted to release the rotary shaft and drum to move from its normal operative position to a position to cause a reverse operation of the machine, reverse electric switch mechanism for causing such reverse operation of the machine, tension means for actuating rotary shaft and associated mechanism when released by the aforesaid trip member from a stationary position, and a stopping and resetting lever adapted to stop the machine under normal conditions and to reset the safety device after it has been thrown into position to reverse operation of the machine following operation of the swingable apron.

2. In combination with the mechanism defined in claim 1, the aforesaid safety device being attached to the frame of the machine and disposed in a depending position for convenience and better disposition of its weight.

3. In a safety device for automatic stopping of various electrically driven machines, the combination with a machine of the type described, of a swingable apron positioned adjacent to and operatively connected with the machine, means for setting the machine into normal operation, electric switch mechanism operatively connected with the swingable apron and adapted to stop the operation of the machine and throw it into reverse operation when the swingable apron is operated, and operatively connected means for limiting the reverse operation of the machine to a predetermined period and thereafter stopping the machine.

4. In a safety device for automatic stopping of various electrically driven machines, the combination with a machine of the type described, of a swingable apron positioned adjacent to and operatively connected with the machine, means for setting the machine into normal operation, electric switch mechanism operatively connected with the swingable apron and adapted to stop the operation of the machine and throw it into reverse operation when the swingable apron is operated, operatively connected means for limiting the reverse operation of the machine to a predetermined period and thereafter stopping the machine, and a stopping and resetting lever for stopping the normal operation of the machine without actuation of the swingable apron and for resetting the machine to its initial position ready for operation of the starting lever.

5. In combination with the mechanism defined in claim 1, an audible signal electrically connected with the aforesaid apparatus and adapted to be sounded when the aforesaid electric switch mechanism is operated to stop the normal operation of the machine.

6. In combination with a safety device for automatic stopping of various electrically driven machines, the combination with a machine of the type described of a manually operable swingable apron, electrically controlled means operable in connection with said apron for stopping and reversing the operation of the machine, a control chamber, a diaphragm movable from a central position to either of two opposite offset positions in the control chamber, a spring-controlled check valve on one side of the control chamber and normally preventing air from escaping from that side of the control chamber, a check valve lever arranged to momentarily actuate the check valve to release a small amount of air from the chamber, said chamber having a separate air escape passage, a needle valve for adjustably controlling the volume of air escaping through said passage, whereby to regulate the period of reverse operation of the machine, and a lever operatively connecting the diaphragm with the aforesaid means for reversing and stopping the operation of the machine.

7. In combination with a safety device for automatic stopping of various electrically driven machines, the combination with a machine of the type described of a manually operable swingable apron, electrically controlled means operable in connection with said apron for stopping and reversing the operation of the machine, a control chamber, a diaphragm movable from a central position to either of two opposite offset positions in the control chamber, a spring-controlled check valve on one side of the control chamber and normally preventing air from escaping from that side of the control chamber, a check valve lever arranged to momentarily actuate the check valve to release a small amount of air from the chamber, said chamber having a separate air escape passage, whereby to control the period of reverse operation of the machine, and a shaft operatively connecting the diaphragm with the aforesaid means for reversing and stopping the operation of the machine, and a lever for operating said shaft.

8. In combination with a safety device for automatic stopping of various electrically driven machines, the combination with a machine of the type described of a manually operable swingable apron, electrically controlled means operable in connection with said apron for stopping and reversing the operation of the machine, a control chamber, a diaphragm movable from a central position to either of two opposite offset positions in the control chamber, a spring-controlled check valve on one side of the control chamber and normally preventing air from escaping from that side of the control chamber, a check valve lever arranged to momentarily actuate the check valve to release a small amount of air from the chamber, said chamber having a separate air escape passage, a needle valve for adjustably controlling the volume of air escaping through said passage, whereby to regulate the period of reverse operation of the machine.

9. In a safety device for automatic stopping of various electrically driven machines, the combination with a machine of the type described, of an electric switch adapted to set the mechanism of the machine in operation, a starting lever operatively connected with same, means for holding said switch in an inoperative position, until the starting lever is operated, a swingable apron arranged in front of the machine, a link connected to said swingable apron, a trip member operable by said link to release the machine from its normal operative position to a position to permit the switch mechanism to move to a position to contact with reverse contacts to cause reverse operation of the machine, reverse contacts for causing a reverse operation of the machine, control means operatively connected with the trip member mechanism for limiting the period of reverse operation and thereafter stopping the machine, and a stopping and resetting lever for stopping the machine under normal conditions and also functioning as a resetting lever to restore the mechanism to its initial inoperative position after having been thrown into reverse operation.

10. In a safety device for automatic stopping of various electrically driven machines and adapted to be attached to such machines, the combination of an electric switch adapted to set the machine to which it is attached in operation, an electric switch adapted to set the machine in reverse operation, a starting lever, means connected with the starting lever for starting operation of the machine by moving the electric switch into operative position, a swingable apron in front of the machine, means operable by said swingable apron for disconnecting the electric switch which maintains operation of the machine and temporarily connecting it with the electric switch for causing a reverse operation of the machine, control means for limiting the period of reverse operation to a predetermined period, and a stopping and resetting lever for resetting the machine to initial position after a reverse operation due to operation of the safety swingable apron and for stopping the machine under normal operating conditions.

JOSIE C. BAREFOOT.